US009282190B2

(12) United States Patent
Rist et al.

(10) Patent No.: US 9,282,190 B2
(45) Date of Patent: Mar. 8, 2016

(54) METHOD FOR TRANSFERRING CONTROL OF A CONFERENCE CALL

(75) Inventors: Claus Rist, Bochum (DE); Martin Glaser, Bengkamen (DE); Michael Willmann, Witten (DE)

(73) Assignee: Unify GmbH & Co. KG, Munich (DE)

( * ) Notice: Subject to any disclaimer, the term of this patent is extended or adjusted under 35 U.S.C. 154(b) by 120 days.

(21) Appl. No.: 13/878,139

(22) PCT Filed: Apr. 4, 2012

(86) PCT No.: PCT/EP2012/001497
§ 371 (c)(1),
(2), (4) Date: Apr. 5, 2013

(87) PCT Pub. No.: WO2013/149628
PCT Pub. Date: Oct. 10, 2013

(65) Prior Publication Data
US 2013/0286899 A1    Oct. 31, 2013

(51) Int. Cl.
*H04M 3/56*    (2006.01)
*H04M 7/00*    (2006.01)

(52) U.S. Cl.
CPC ............. *H04M 3/56* (2013.01); *H04M 3/567* (2013.01); *H04M 7/0012* (2013.01); *H04M 2203/5018* (2013.01)

(58) Field of Classification Search
USPC ............... 370/225, 260, 395.2; 709/203–208, 709/228; 455/416
See application file for complete search history.

(56) References Cited

U.S. PATENT DOCUMENTS 5,936,662 A * 8/1999 Kim et al. .............. 348/14.09
6,822,942 B1 * 11/2004 Jackson et al. ............ 370/254
(Continued)

FOREIGN PATENT DOCUMENTS

CN    101808220 A * 8/2010
CN    101883342 A * 11/2010
(Continued)

OTHER PUBLICATIONS

Written Opinion of the International Searching Authority for PCT/EP2012/001497 dated Dec. 14, 2012 (Form PCT/ISA/237) (German Translation).
(Continued)

*Primary Examiner* — Edan Orgad
*Assistant Examiner* — Steven Willmore
(74) *Attorney, Agent, or Firm* — Buchanan Ingersoll & Rooney PC

(57) ABSTRACT

The invention concerns a method for transferring control of an existing multi-participant conversation (5, 15, 25), in which at least two communication terminals (D1, D2, D3) are connected to each other through a data connection (C1, C2, C5), to a conference control application (KS). The method comprises the following steps: Establishment of a virtual conference room (CR) that serves as an anchor point for the application (KS) and can be a virtual participant in the conference, switching (9, 19, 29, 39, 49, 59) of the conference room (CR) into the existing data connection (C1, C2, C5), and assignment (8, 20, 30, 40, 50, 60) of the master role to the conference room (CR), wherein a signal generated by the application (KS) causes the switching (9, 19, 29, 39, 49, 59) of the conference room (CR) into the existing data connection (C1, C2, C5), and the assignment (8, 20, 30, 40, 50, 60) of the master role to the conference room (CR).

19 Claims, 7 Drawing Sheets

(56) References Cited

U.S. PATENT DOCUMENTS

| | | | |
|---|---|---|---|
| 7,839,803 B1* | 11/2010 | Snelgrove et al. | 370/260 |
| 8,488,764 B1* | 7/2013 | Swartz | 379/204.01 |
| 2003/0012343 A1* | 1/2003 | Mou et al. | 379/32.04 |
| 2004/0128354 A1* | 7/2004 | Horikiri et al. | 709/204 |
| 2005/0021610 A1* | 1/2005 | Bozionek et al. | 709/203 |
| 2005/0066001 A1* | 3/2005 | Benco et al. | 709/204 |
| 2005/0117816 A1* | 6/2005 | Saeger et al. | 382/305 |
| 2005/0123117 A1* | 6/2005 | Stockdale | 379/207.02 |
| 2005/0237952 A1* | 10/2005 | Punj et al. | 370/260 |
| 2006/0077252 A1* | 4/2006 | Bain et al. | 348/14.09 |
| 2006/0233176 A1* | 10/2006 | Stumer | 370/395.2 |
| 2008/0037751 A1* | 2/2008 | Aldrey et al. | 379/202.01 |
| 2008/0095079 A1* | 4/2008 | Barkley et al. | 370/260 |
| 2008/0159490 A1* | 7/2008 | Gaudin et al. | 379/88.16 |
| 2008/0159509 A1 | 7/2008 | Whitfield et al. | |
| 2008/0160977 A1* | 7/2008 | Ahmaniemi et al. | 455/416 |
| 2009/0022214 A1* | 1/2009 | Locke | 375/222 |
| 2010/0007713 A1* | 1/2010 | Yamamoto | 348/14.08 |
| 2010/0241721 A1* | 9/2010 | Cha | 709/206 |
| 2011/0125913 A1* | 5/2011 | Maes | 709/228 |
| 2011/0173270 A1* | 7/2011 | Uchida et al. | 709/206 |
| 2011/0282962 A1* | 11/2011 | Suzuki | 709/208 |
| 2011/0299387 A1* | 12/2011 | Eydelman et al. | 370/225 |
| 2012/0163577 A1* | 6/2012 | Buford et al. | 379/202.01 |
| 2013/0152153 A1* | 6/2013 | Weiser et al. | 726/1 |

FOREIGN PATENT DOCUMENTS

| | | | |
|---|---|---|---|
| CN | 102170361 A | * | 8/2011 |
| EP | 1924051 A1 | | 5/2008 |

OTHER PUBLICATIONS

International Search Report for PCT/EP2012/001497 dated Dec. 14, 2012 (Forms PCT/ISA/220, PCT/ISA/210) (German Translation).

* cited by examiner

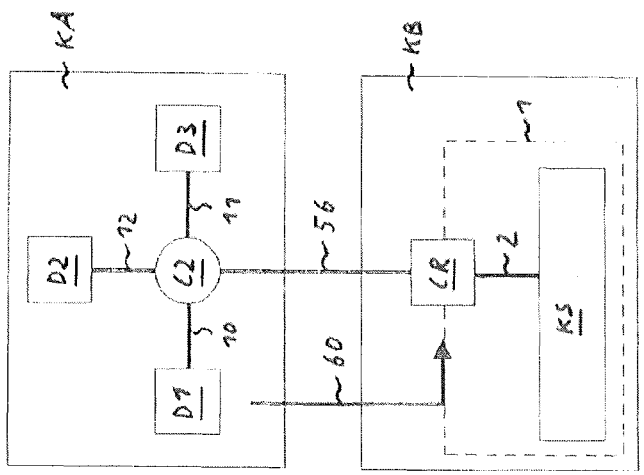
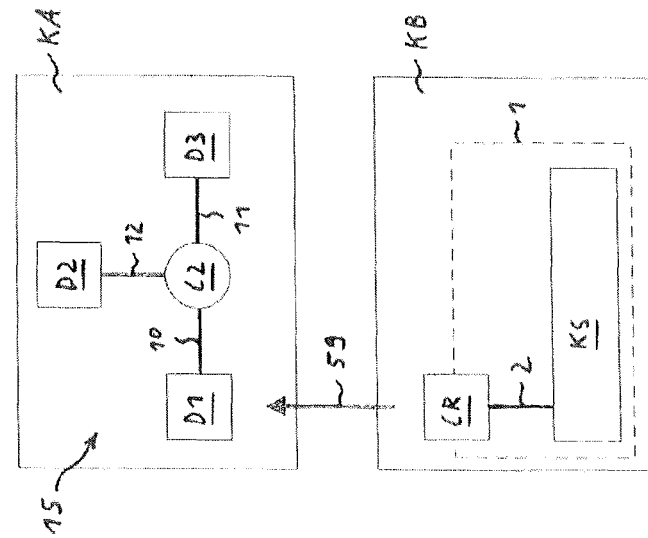
FIG. 6A  FIG. 6B  FIG. 6C

METHOD FOR TRANSFERRING CONTROL OF A CONFERENCE CALL

CROSS REFERENCE TO RELATED APPLICATIONS

This application is the United States national phase under 35 U.S.C. §371 of PCT/EP2012/001497, filed on Apr. 4, 2012.

BACKGROUND OF THE INVENTION

1. Field of the Invention

Embodiments relate to methods for transferring control of an existing multi-participant conversation, in which at least two communication terminals are connected to each other through a data connection, to a conference control application. Embodiments further pertain to a computer program product for executing such a method.

2. Background of the Related Art

Current conference servers have the disadvantage that only individual participants, specifically the individual terminal of a participant in the existing multi-participant conversation, can be connected in an application-controlled conference bridge, also called an application-controlled conference. The possibility of incorporating only one individual participant into an application-controlled conference is independent of the selected conference type, such as an Ad-Hoc conference, Meet-Me conference, or Permanent conference. In order to add a multi-participant conversation, hereinafter defined as a communication connection in which at least two communication terminals are exchanging data with each other through a communication connection, into an application-controlled conference, the participants in the conference who wish to incorporate the multi-participant conversation into their conference must end their existing multi-participant conversation and set up a new multi-participant conversation through the conference server that includes the new participants to be added. This and other disadvantages of existing conferencing systems may be remedied by embodiments discussed herein.

BRIEF SUMMARY OF THE INVENTION

We provide embodiments to reduce the length of an interruption in a multi-participant conversation when control of the multi-participant conversation is transferred to a conference control application.

In particular, it should be a method for transferring control of an existing multi-participant conversation to a conference control application and a computer program product for executing such a method, with which it is possible to incorporate an existing system conference into an application-controlled conference or convert the existing system conference to the application-controlled conference, wherein the length of the interruption in the multi-participant conversation is reduced to the point that the incorporation or conversion is almost or entirely interruption-free from the participants' perspectives.

BRIEF DESCRIPTION OF THE FIGURES

Unless specifically stated otherwise, the same reference numbers in the figures denote the same components with the same meaning. The figures show:

FIGS. 6a to 6c: each shows a schematic arrangement of logical units that are applied to execute the invented method in a sixth embodiment, in which the conference room is switched directly into the existing data connection as in the fifth embodiment shown in FIGS. 5a to 5c, wherein in the sixth embodiment the conference room is incorporated into the existing multi-participant conversation on a network.

DETAILED DESCRIPTION OF THE INVENTION

Figure 1B:
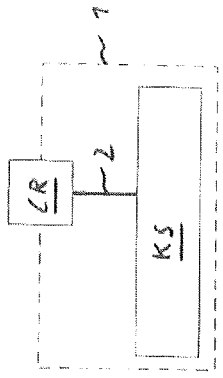
FIG. 1a to FIG. 1d: each shows a schematic arrangement of logical units that are applied to execute the method for transferring control of an existing multi-participant conversation to a conference control application in a first embodiment, in which a conference room is incorporated into a multi-participant conversation with two participants.

In the following, a conference control application is understood to mean a program, in particular a computer program or software application, that allows a user to control a conference. The term "conference control application" is shortened to the term "application" in the following, and any reference to an application other than the conference control application will be identified as such. If the application is run on a computer, it can combine voice signals from conference participants. The application can be installed and/or run, in particular, on a personal computer (PC). Such a PC is also called a media server or application server. In the following, in addition to a computer on which the application is installed, such as a media server or application server, the application itself is called a conference server. In this regard, the term "conference server" is used in the following to designate both running the application in software form and also the hardware used to run it. As opposed to an application-controlled conference, which is controlled through the conference server, in a system conference the conference is controlled through the user interface of a communication terminal, herein called a terminal. Control through the user interface of a terminal is not possible in the case of an application-controlled conference using the conference server, because the conference server is an independent component of the system that includes at least the conference server and the terminals used by the conference participants during the conference. The terminals participating in the conference can be controlled using CTI (Computer Telephony Integration), a feature supported by many telephone systems. While the CTI support in a system conference is a 1:1 representation of the control from the terminal used to control the system conference (via that terminal's user interface), the CTI support in an application-controlled conference does not represent the user interface of a terminal, but rather the conference server itself.

The conference server is equipped to act as the server, receiving voice signals from the conference participants' terminals and sending the combined voice signals to the conference participants' terminals. A participant's terminal can be a telephone, IP phone, or PC client, and other terminals are also possible, such as a mobile phone or another server. At least three participants are involved in a conference, wherein one participant, for example the conference leader, does not have to exchange data with another participant via voice or data transfer during the conference. This means that a conversation between two participants that is hosted by a conference leader is also considered a conference. A conference is understood to mean, in particular, a telephone conference call in which the conference participants are not all in the same place and therefore cannot communicate with each other without electronic assistance. Instead, the participants communicate through the conference server, which combines the participants' voice signals so that a conference such as a telephone conference call or video conference can take place. In a telephone conference call, the participants communicate only by exchanging voice signals, regardless of how the participants' voice signals are transmitted. Therefore, either a telephone conference taking place on a wired network or a telephone conference in which one or more participants are communicating with each other via a mobile wireless network can be considered a telephone conference call.

A conference can also be in the form of a video conference, in which, in addition to the exchange of participants' voice signals, participants' image signals are transmitted to other participants in real time. In the following, however, a conference is also understood to include application sharing, in which, in addition to the exchange of participants' voice and image signals, other media are exchanged among the conference participants, such as data transmitted between participants. These data can be displayed either at the same time as the participants' voice and/or image signals or time-delayed behind those signals, on the screen of a PC for example. Because higher data speeds are required to transmit simultaneous voice and/or image and/or data signals than for an ordinary telephone conference call in which only the participants' voice signals are sent, application sharing often involves the use of an intranet or the Internet as the transmission medium. The conference server is usually connected through a network, such as an intranet or the Internet, to the conference participants' terminals. In this case, the voice and/or image and/or data signals are transmitted from one conference participant to another in the form of data packets. The transmission medium for the voice signals combined by the conference server and sent during the conference can also be a standard circuit-switched telecommunication switching system or a combination of a circuit-switched network and a packet-switched network. The transmission protocol in a circuit-switched network can be, for example, ISDN (Integrated Services Digital Network), while for a packet-switched network, for example, transmission protocol H.323, SIP (Session Initiation Protocol) or TCP/IP (Transmission Control Protocol/Internet Protocol) can be used.

The application can be provided in software form as OpenScape Office MX or OpenScape Office LX from Siemens Enterprise Communications GmbH & Co. KG, for example. While OpenScape Office LX uses server-based Unified Communications Software that can be operated on a Linux server regardless of the platform, with OpenScape Office MX the application is pre-installed in a 19-inch housing as an all-in-one Unified Communications solution with pre-installed software. The OpenScape Office MX can be used as a standalone system or as a gateway for OpenScape Office LX. An additional use of the conference control application from the same manufacturer is called DACS (Digital Alarm and Communication Server), in combination with a HiPath 3000, for example. With a DACS, telephone conferences with up to 60 participants can be defined, scheduled, initiated, and controlled over the Internet.

These conference servers offer the advantage of having the application add an additional participant automatically into an ongoing conference. It is also possible to apply a time limit, such as a maximum conference length. The maximum number of conference participants can be increased by adding an additional participant. Compared to a system conference, it is easier to monitor users in an application-controlled conference with a conference server, because all conference participants can be seen in a "Conference Spider." When another participant is added to the conference, the participants already in the conference remain in the existing voice connection established for the conference, so that there is no conference interruption for the conference participants due to a callback, as would occur with manual expansion of the conference in system conference form. Our invention may also facilitate multiparticipant conferences.

The new multi-participant conversation can be set up by having the conference server be connected through a so-called conference device or conference room as a virtual conference participant in the conversation to be set up. The conference room is then a virtual element of the conference, by which the conference, or specifically the conference bridge, is expanded.

The conference room treats the communication terminals involved in the conference bridge like another communication terminal. Because the conference room is not used primarily for exchanging voice and/or image data with the additional communication terminals in the conference, but instead the application controls the conference, the conference room is also designated as a virtual participant, i.e., a participant for whom the conference was expanded. The conference room thereby fulfills the function of an anchor point for the conference control application. The anchor point makes it possible for the application to engage in handling the conference system and thereby take control of the conference. The conference room can represent the conference master, also called simply the master, as the anchor point for the application. In the following, the master is considered to be the element to which the conference leader function, also called the master role, is assigned. The master allows a (human) conference leader to assume the master role, i.e., the conference leader function. Because the conference room is controlled by the application, the master is also controlled by the application that is most used by the conference leader.

The conference server, which comprises the application in software form (OpenScape Office LX or MX) or the hardware on which the application is installed, then makes the conference room available or monitors the conference room, so that communication connections, also called Calls, are made successively by the conference server to each conference participant. The conference room can be monitored as an anchor point for the application using CSTA (Computer-Supported Telecommunications Applications). CSTA is a protocol specification standardized by the ECMA (European Computer Manufacturers Association), which is used for data traffic between a telephone system and computer programs. However, the CSTA protocol defines only the data to be transmitted, not the transport portion. For coding the data stream, Basic Encoding Rules (CSTA Phase I, II and III) and XML Encoding Rules (CSTA Phase III) are used. The CSTA protocol can be carried via various media, such as serial, ISDN, or TCP-IP. Connecting the conference participant's communication terminal to the conference room can be controlled by authentication, so that only the communication terminals of authorized conference participants are connected. After all conference participants' terminals are switched or connected to the conference room, the new multi-participant conversation can be controlled by the application, with the conference room as the anchor point for the application and as the conference master.

Because, in order to be incorporated into an application-controlled conference, an existing multi-participant conversation must be ended before the communication connections to the participants' terminals are made successively by the conference server, the existing multi-participant conversation can only be incorporated or converted into an application-controlled conference with a noticeable interruption for the participants in that conversation. To date it has not been possible to connect a conversation between two participants or a system conference involving a multi-participant conversation into an application-controlled conference or to convert the system conference into an application-controlled conference, without the participants in the multi-participant conversation experiencing a noticeable interruption in it. Because only one individual participant's terminal at a time can be switched quickly to a conference server, it is also impossible, for example, to connect a conversation between two participants with another conversation between two participants to make a conference with four participants without a noticeable interruption for the participants. A prerequisite for incorporating or converting a multi-participant conversation into an application-controlled conference without a noticeable interruption of the participants in the multi-participant conversation is reducing the length of the interruption in the multi-participant conversation that occurs when control of the multi-participant conversation is transferred to the application. In this way, the time-consuming conversion of an existing multi-participant conversation into an application-controlled conference could be accelerated. Converting a system conference into an application-controlled conference in practice is more important, because application-controlled conferences and system conferences can be assigned to different ranges of the available conference channels, and different conversation control capabilities are available to the conference leader, also called the conference controller, if the conference leader is using the master role for the conference.

According to a method for transferring control of an existing multi-participant conversation, in which at least two communication terminals are connected to each other through a data connection, to a conference control application, a virtual conference room is set, which can be the anchor point for the application and a virtual participant in the conference, the conference room is switched into the existing data connection, and a master role is assigned to the conference room, whereby signals from the application cause the conference room to be switched into the existing data connection and the master role to be assigned to the conference room. The multi-participant conversation and the application can be located on system levels within a unit or in different units. Setting up the conference room can include connecting the application with the conference room.

Alternatively or additionally, the conference room can be set up by the application. Having the application send the signal for the conference room to be switched into the data connection and assign the master role to the conference room eliminates the previously complicated and time-consuming manual task of ending the multi-participant conversation and then having the conference control application set up a new multi-participant conversation with the participants from the ended multi-participant conversation. With the invented method, transferring control of the multi-participant conversation to the application is made easier. Because manually ending the multi-participant conversation is eliminated and control of the multi-participant conversation is transferred automatically when signaled by the application, transferring control of the multi-participant conversation to the application happens so quickly that the transfer is almost or entirely interruption-free for the participants in the multi-participant conversation, and so the basic objective of the invention is achieved. If the multi-participant conversation is a system conference, an invented method is applied to convert that system conference into an application-controlled conference, with a shorter interruption than the prior state of the art. After converting the system conference into an application-controlled conference, the application can use the invented method to add more potential participants into the existing application-controlled conference.

In the same fashion, by applying an invented method, a multi-participant conversation between just two participants, also called a 2-way conversation, can be converted to an application-controlled conversation, so that additional potential participants can be added into the application-controlled conversation.

An invented method also allows an application-controlled conference to be incorporated or converted into another application-controlled conference, almost or entirely interruption-free for the participants. A transfer of control of a multi-participant conversation to the application that is almost or entirely interruption-free for the participants is understood to be a transfer of control of the multi-participant conversation that takes place in less than one second. Although technically there is an interruption in control of the multi-participant conversation due to the transfer of that control to the application, when the interruption due to transferring control of the multi-participant conversation lasts less than one second, that technical interruption is barely or not at all noticeable to the participants in that multi-participant conversation.

Switching the conference room into the existing data connection is also known as conferring. Signaling the switching of the conference room into the data connection and the assignment of the master role to the conference room can take place at the same time, which minimizes the interruption in the multi-participant conversation. With simultaneous switching of the conference room into the data connection and assignment of the master role to the conference room, transferring control of the multi-participant conversation is a one-step action from a signal technology standpoint, since setting up the conference room causes no interruption in the multi-participant conversation. The conference room can be an anchor point for the application, as described, for example, in ECMA Technical Report TR/82, 2$^{nd}$ edition, June 2009. The application can be located within the conference system or can be a separate (logical) unit. By means of the signaling from the application that switches the conference room into the data connection and assigns the master role to the conference room, the conference room is incorporated into the existing multi-participant conversation with a shorter interruption because the conference room is fully functional as the master of the conference.

Advantageously, the multi-participant conversation is such that at least three communication terminals are connected to each other. For such a multi-participant conversation, a conference, such as a system conference, can be converted or incorporated into an application-controlled conference. After the system conference is incorporated or converted into the application-controlled conference, the advantages of a conference server are available to the conference leader of the previous system conference, with the simultaneous option of using the application to add additional conference participants to the existing multi-participant conversation. As opposed to a system conference, the application-controlled conference offers the option of increasing the maximum number of participants in the multi-participant conversation.

In one embodiment, the master role is assigned to the conference room by transferring the master role of the multi-participant conversation master from a communication terminal to the conference room. By transferring the master role of the multi-participant conversation master from a communication terminal that is being used for the multi-participant conversation to the conference room, control of the multi-participant conversation can be transferred quickly and easily to the application. Transferring the master role of the multi-participant conversation master and assigning the master role to the conference room may not apply in the case of a multi-participant conversation with only two communication terminals having one participant each, because in a 2-way conversation it is not necessary for a master role to be recognized by one of the communication terminals used by a participant in the multi-participant conversation.

Compared to the embodiments described above, the embodiment in which the multi-participant conversation takes the form of a system conference has the advantage that manual leadership control of the multi-participant conversation is handed over to the application, and therefore the application makes it possible to add additional potential participants to the existing multi-participant conversation and/or to increase the maximum number of participants in the multi-participant conversation. This advantage is especially evident when, according to another embodiment, the system conference is incorporated or converted into an application-controlled conference.

Advantageously, system-controlled conference channels for the system conference are changed to application-controlled channels for the conference control application. If the system requires separation of the available conference channels for system-controlled and application-controlled conferences (as is the case with OpenScape Office, for example), then changing the system-controlled conference channels to application-controlled conference channels maintains a balance between the two types of conferences and conference channels.

Before the conference room is switched into the existing data connection, the conference room is advantageously handed over to the multi-participant conversation master's communication terminal, using the service operation CorNet-NQ or QSIG Single Step Call Transfer. Handing the conference room over to the multi-participant conversation master's communication terminal, or transferring the conference room to the multi-participant conversation master's communication terminal, is done quickly and resource-efficiently using this service operation.

In another embodiment, before the conference room is switched into the existing data connection, a call-waiting signal for the conference room is generated at the multi-participant conversation master's communication terminal in less than one second. A call-waiting signal is generated in particular after a direct call from the conference room to the multi-participant conversation master's communication terminal or after the conference room is transferred to the multi-participant conversation master's communication terminal. Current call-waiting events occur after five seconds. With call-waiting signals that are generated in less than one second, the interruption of the multi-participant conversation while control of the multi-participant conversation is transferred to the application is minimized. In this case, the interruption of the multi-participant conversation is so short that it is barely or not at all noticed by the participants in the multi-participant conversation. The service operation CorNet-NQ or QSIG Single Step Call Transfer is a CorNet-NQ or QSIG Facility Operation. The use of other operations or services with the same effect of transferring the conference room to the multi-participant conversation master's communication terminal is possible.

Another embodiment involves switching the conference room into the existing data connection using the service operation CSTA Service Conference Call or the service operation CSTA Service Join Call. CSTA services can be taken from the ECMA Guidelines 269, 8$^{th}$ edition, June 2009, for example. After the conference room has generated a call-waiting signal at the multi-participant master's communication terminal, the conference room can be switched into the existing data connection using CSTA Service Conference Call, for example. With CSTA Service Join Call, the conference room can be switched directly into the existing data connection, and the master role of the conference room can be assigned together with that switch. Direct switching of the conference room into the existing data connection is available in particular in networked systems in which the conference room is incorporated from a network. Direct switching of the conference room into the existing connection involves undocumented application of CSTA Service Join Call and constitutes an expansion of the CSTA services according to Guideline ECMA-269.

Advantageously, after the conference control application is used to assign the master role to the conference room, additional communication terminals are added into the multi-participant conversation with node overlapping. For application-controlled conferences, as opposed to a system conference, after assignment or conversion of the master role from the multi-participant master's communication terminal, with the conference control application the conference room is able to add additional participants into the existing multi-participant conversation with node overlapping. Additional participants can be added or incorporated into the existing conversation through a local or remote conference point. If the multi-participant conversation was run as a system conference, the system conference becomes a user-friendly application-controlled or application-directed conference that is almost or entirely interruption-free for the participants in the system conference.

In another embodiment, the conference room in a source node of a network in the existing data connection is switched into a target node of the network, and a network trunk in the target node assumes the master role as a proxy. The network comprises a source node, in which the conference room is located, and a target node, in which the data connection is located. Typically, the application is also located in the source node together with the conference room. In addition, typically the communication terminals connected through the data connection are located together with the data connection in the target node of the network. If a network trunk is now placed in the target node that is connected to the communication terminals that are connected to each other through the data connection, the network trunk, as a proxy, can assume the master role that was assigned to the conference room in the source node after control of the multi-participant conversation was transferred to the application. The network trunk functions here as a go-between, which on one side receives queries from the conference room and then uses a connection to the communication terminals used in the multi-participant conversation through its own address as a point of communication in the network. With the network trunk inserted as a proxy, the address of the conference room remains hidden from the communication terminals. On the other side, when other networks are added, the network trunk makes a connection between the conference room and the communication terminal, even when the (network) address of the communication terminal and the (network) address of the conference room are incompatible with each other and a direct data connection is not possible. Because the network trunk as a proxy plays only a go-between role between the conference room and the communication terminals, the master role remains in the conference room.

An advantageous embodiment involves using a service operation to switch the conference room in a source node in the existing data connection to a target node via a single-system image in the source node. For example, the service operation CSTA Service Join Call can be used to switch the conference room in the existing data connection via the single-system image, with the appropriate middleware in the source node in which the conference room is located. In a single system image, multiple systems, for example multiple nodes, each representing an independent system, are seen outwardly as an individual system. The application therefore cannot know in which node or system a service or service operation needs to be applied. The middleware offers an interface to all systems, wherein applications used to operate the systems register centrally on the middleware. The control information transmitted via the CSTA Service Join Call can then be forwarded on, for example, by an appropriate CorNet-NQ Facility Operation to the target node in which the existing data connection is located. In this way, multi-participant node control of a conference, also called multi-node control, can be established. According to the preceding embodiment, the master role in the local or remote multi-participant conversation, which can be run as a system conference, can be assumed in the target node of the network trunk as a proxy.

The conference control application is advantageously run as a conference server. According to the previous definition, the conference server is operated either by software, as an application, or by hardware, as a server. For example, the application can be run as a conference server on a Linux server according to OpenScape Office LX.

The conference leader of the multi-participant conversation up to that point, once the master role is assigned to the conference room, can run the conference only via the conference server and no longer via the user interface of his terminal, if the multi-participant conversation was being run as a system conference.

In addition to the method for transferring control of an existing multi-participant conversation to a conference control application, this invention also includes a computer program product for executing such a method. The computer program product can consist of software, for example. The computer program product can be stored as binary data on a floppy disk, DVD, CD-ROM, or memory card. The computer program product can also consist of printed source code.

The invention also includes an application server on which the computer program product is installed. The application server can be a desktop PC, laptop, server in a 19-inch housing, or other type of hardware.

By switching the conference room into the existing data connection and assigning a master role to the conference room, the conference room is incorporated into the existing multi-participant conversation. The conference room can be incorporated into the multi-participant conversation with no interruption or barely any interruption for the participants in the multi-participant conversation using a variety of configurations, such as one node, multiple nodes, or multiple networks, and in one or more stages, for example via a CTI link or networking protocol. The desired configuration can therefore be combined with one-stage or multi-stage incorporation of the conference room into the multi-participant conversation. If multiple service operations are used to incorporate the conference room into the multi-participant conversation, the system internally sequences the multiple service operations so that the incorporation involves multiple stages or steps.

If only one service operation is used to incorporate the conference room into the multi-participant conversation, then incorporating the conference room into the multi-participant conversation involves only one stage or step. Both one-stage and multi-stage incorporations of the conference room into the multi-participant conversation can be done with no interruption or barely any interruption for the participants in the multi-participant conversation. For example, the conference room can be incorporated into the multi-participant conversation in one stage using CSTA Service Join Call. Alternatively, the conference room is incorporated into the multi-participant conversation in multiple stages using CorNet-NQ or QSIG Single Step Call Transfer combined with a call-waiting (camp-on) signal and CSTA Service Conference Call.

Additional exemplary embodiments and also advantages of the invention will be explained below with reference to the figures. For better illustration, a scale or correct proportional representation is not used in the figures.

Figure 1D:
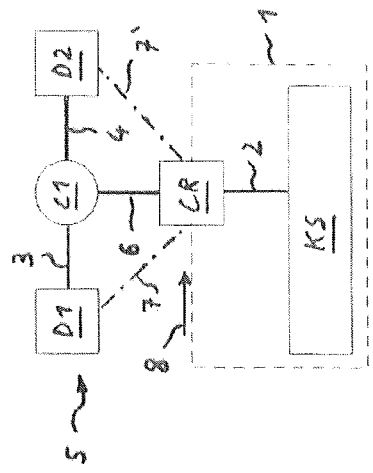
Figure 1A:
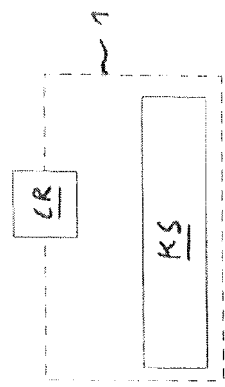

FIG. 1a shows schematically an arrangement with a conference control application KS and a conference room CR, wherein the conference control application and the conference room are in the form of software in a conference server 1. Because the conference room CR is acting as a link between the conference server and the multi-participant conversation to be linked to it, the conference room is functioning as a logical outward interface of the conference server and is therefore not shown within the shaded rectangle that represents the conference server, but rather on the edge of the shaded rectangle.

In FIG. 1b, the conference room is connected to or with the application within the conference server 1. Using logical connection 2 between the conference room CR and the application KS, the application KS is able to control a multi-participant conversation linked to the conference room CR. The logical connection 2 allows two-way data traffic of control data, such as signaling data, from the conference room CR toward the application KS and from the application KS toward the conference room CR. The logical connection 2 can be established as part of running application KS or in a separate step after starting the application KS.

Figure 1C:
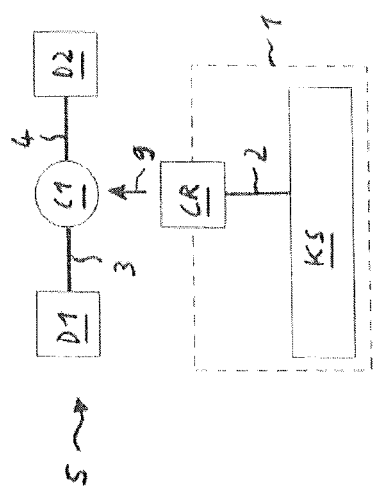

FIG. 1c shows, in addition to the logical units for the conference room CR and the application KS, a multi-participant conversation with two participants, wherein a first participant is conducting the multi-participant conversation 5 with a communication terminal D1 and a second participant is conducting the multi-participant conversation 5 with a communication terminal D2. Communication terminals D1 and D2 can be, for example, a mobile telephone, a land-line telephone, a PC, a PDA (personal digital assistant), a tablet PC, or any other communication device through which the participants in the multi-participant conversation can exchange voice and/or image data with each other, wherein the participants in the multi-participant conversation are located in different places, so that face-to-face communication between the participants is not possible. The communication terminal D1 is connected to the communication terminal D2 through a connection point 3 and another connection point 4, wherein the connection points 3 and 4 form a logical connection C1 between the communication terminal D1 and the communication terminal D2 FIG. 1c shows the method step of switching the conference room into the existing data connection C1 as the arrow 9 from the conference room CR toward the existing data connection C1.

In FIG. 1d, the conference room CR is switched through the connection point 6 into the existing data connection C1 between D1 and D2. The existing data connection C1 then includes the communication terminals D1 and D2, as well as the conference room CR as virtual participants, so that the data connection C1 then includes the data connection points 3, 4, and 6. Because, unlike the communication terminals D1 and D2, the conference room CR has no participants in a multi-participant conversation or conference assigned to it who are exchanging voice and/or image data with other participants, but instead the conference room CR is used only as a virtual participant to control the multi-participant conversation or conference, the conference room is not designated as a participant's terminal but rather as a virtual participant in the multi-participant conversation or conference.

As an alternative to the connection point 6, with which the conference room CR is switched directly into the existing data connection C1, including the connection points 3 and 4, it is also possible, instead of the connection point 6 from the conference room CR, to establish a connection 7 to the communication terminal D1 and from the conference room CR a connection 7' to the communication terminal D2, such that the conference room needs the existing data connection C1 connected with the communication terminals D1 and D2. In this regard, switching the conference room into the existing data connection is understood to mean, among other things, a separate connection from the conference room to each of the communication terminals D1 and D2 involved in the multi-participant conversation, wherein after establishing the connection(s) from the conference room to the communication terminals D1 and D2, signaling data can be transferred through the connection(s) to the communication terminals D1 and D2.

FIG. 1d shows, with the arrow 8, schematically the method step through which the conference room CR is assigned a master roll. In the case of the multi-participant conversation involving the communication terminals D1 and D2, each of which is used by one of the two participants in the multi-participant conversation to conduct the multi-participant conversation 5, because there is no master role that would be necessary for conducting the multi-participant conversation 5, no master role for the existing multi-participant conversation with a 2-way conversation can be transferred to the conference room. Therefore, after switching the conference room CR into the existing data connection C1, a master role is assigned to the conference room CR. Alternatively, the master role can be assigned to the conference room CR at the same time as the conference room CR is switched into the existing data connection C1. Such a one-step or one-stage incorporation of the conference room into the existing 2-way conversation is possible using the service operation CSTA Service Join Call, for example. In this one-step case of incorporating the conference room CR into the existing data connection C1, control of the existing multi-participant conversation 5 is transferred to the application KS with no interruption or barely any interruption for the participants in the existing multi-participant conversation; i.e., transferring control of the multi-participant conversation 5 to the application KS causes no interruption or a barely noticeable interruption in the conversation between the participants in the multi-participant conversation.

Alternatively, switching the conference room CR into the existing data connection C1 and assigning the master role to the conference room CR can be done using the service operation CSTA Service Conference Call. Because, according to the schematic arrangement in FIG. 1d, after switching the conference room CR into the existing data connection C1, the conference room CR is incorporated into the multi-participant conversation as an additional (virtual) participant together with the two participants in the existing multi-participant conversation, a conference then exists that includes the conference room and the participants in the multi-participant conversation who are using communication terminals D1 and D2, wherein this conference is controlled by the application KS.

Figure 2A:
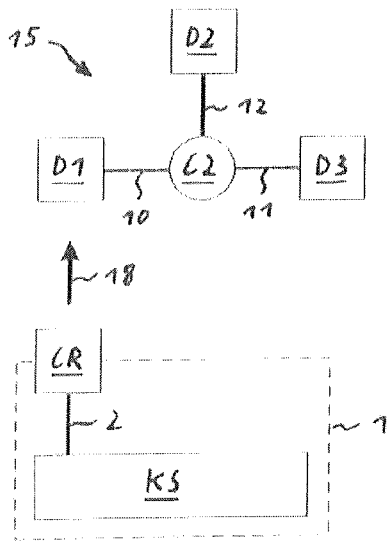
FIGS. 2a to 2d: each shows a schematic arrangement of logical units that are applied to execute the method for transferring control of an existing multi-participant conversation to a conference control application in a second embodiment, in which a conference room in a multi-participant conversation with three participants is transferred to the master of the existing multi-participant conversation and then switched into the existing data connection.

FIG. 2a shows schematically an arrangement consisting of an existing multi-participant conversation with three participants, who are connected to each other through the existing data connection C2 using communication terminals D1, D2, and D3 through connection points 10, 12, and 11. The conference server 1, in which the application KS is connected with the conference room CR via connection 2, is linked to the multi-participant conversation 15, so the conference room CR is transferred or handed over to the master of the existing multi-participant conversation 15, who is operating the communication terminal D1. This process is shown schematically in FIG. 2a with the arrow 18.

Figure 2B:
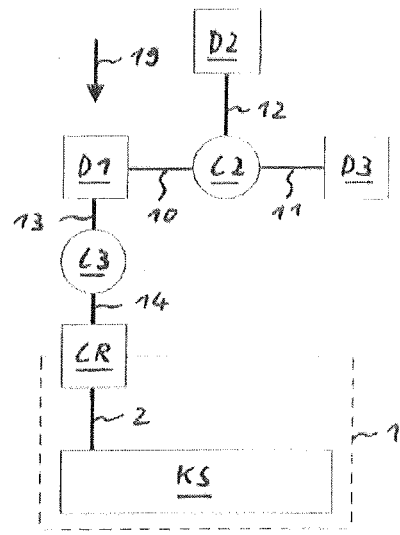

In FIG. 2b, the conference room CR is connected to the communication terminal D1, which is functioning as master of the multi-participant conversation 19, through the logical connection C3, including connection points 13 and 14. The conference room CR is transferred or handed over to the master of the existing multi-participant conversation 15, located on the communication terminal D1, using the resource-efficient service operation CorNet-NQ or QSIG Single Step Call Transfer, for example. The CorNet-NQ or QSIG Facility Operation Single Step Call Transfer is used to convey or transfer a communication terminal D1, D2, or D3 to the conference room CR. This causes an immediate call-waiting signal (camp-on) for the conference room CR in the communication terminal D1, to which the master role of the existing multi-participant conversation 15 is assigned. Traditionally, a call-waiting signal begins after five seconds. With a call-waiting signal lasting five seconds, it is not possible to transfer control of the multi-participant conversation 15 to the application KS with no interruption or barely any interruption for the participants of the multi-participant conversation 15, so the call-waiting signal for the conference room CR at the communication terminal D1 of the master of the multi-participant conversation 15 occurs in less than one second.

After the conference room CR is transferred to the communication terminal D1 as master of the multi-participant conversation 15 and an existing data connection C3 has been established between the conference room CR and the communication terminal D1, the conference room CR is switched into the existing data connection C2 of the multi-participant conversation 15; this process is also called "conferring" and is shown schematically in FIG. 2b as arrow 19. The service operation CSTA Service Conference Call, for example, can be used to switch the conference room CR into the existing data connection C2.

Figure 2C:
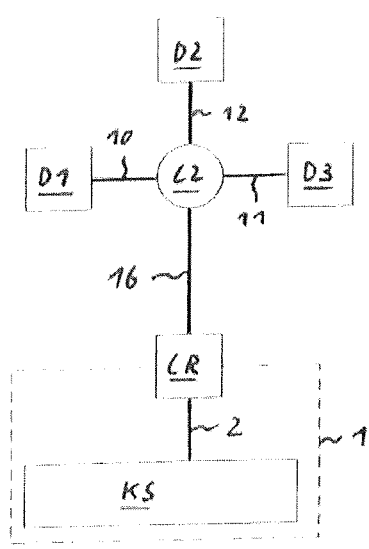

After the conference room CR is switched into the existing data connection C2, the conference room CR is connected via the connection point 16 to the existing data connection C2, which then includes connection points 10, 11, 12, and 16, as shown in FIG. 2c.

Figure 2D:
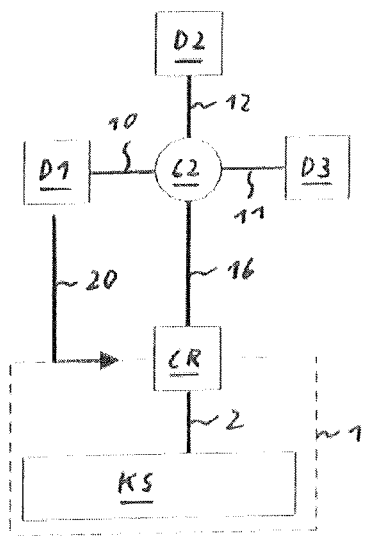

In FIG. 2d, as shown schematically by the arrow 20, the master role that was previously assumed by the communication terminal D1 is assigned to the conference room CR by transferring the master role from the multi-participant conversation 15. After the master role is assigned to the conference room CR, the conference room CR is incorporated into the multi-participant conversation 15, which includes the communication terminals D1, D2, and D3, as a virtual participant. After the conference room is incorporated, the multi-participant conversation has four participants: the participants using terminals D1, D2, and D3 and the conference room as a virtual participant. Using the service operation CSTA Service Conference Call, the conference room can be incorporated into the multi-participant conversation 15 in one step or one stage, by switching the conference room into the existing data connection C2 and assigning the master role from the terminal D1 to the conference room. CSTA service operations, such as the service operation CSTA Service Conference Call, are used here to control the conference, for example to initiate, expand, or disconnect, i.e., terminate, communication connections.

Although control of the multi-participant conversation 15 can be transferred to the application KS, according to the second embodiment shown schematically in FIGS. 2a to 2d, in multiple steps or stages, because transferring the conference room CR to the terminal D1 as the master of the existing multi-participant conversation 15 and switching the conference room into the existing data connection C2 with assignment of the master role to the conference room are done in different steps, for example using CorNet-NQ or QSIG Single Step Call Transfer and CSTA Service Conference Call, the interruption of the multi-participant conversation 15 caused by performing these steps can be so short for the participants in the multi-participant conversation that it is barely or not at all noticed by the participants in the multi-participant conversation and is therefore considered entirely or almost interruption free for the participants in the multi-participant conversation. In addition, although multiple services are sequenced within the system, such as CorNet-NQ or QSIG Single Step Call Transfer and CSTA Conference Call, as part of the second embodiment according to FIGS. 2a to 2d, sequencing these services or service operations is done entirely or almost interruption-free for the participants in the multi-participant conversation.

Using CSTA Service Conference Call to switch the conference room CR into the existing data connection C2 and transferring the master role to the conference room constitutes an expanded application of the service operation CSTA Service Conference Call according to ECMA Guidelines 269, 8th edition, June 2009. The service operation CSTA Service Conference Call is used here to initiate a conference or to add a participant into an existing conference. In this way the conference room's connection through data connection C3 on the communication terminal D1 is transferred to the conference room CR being connected in the existing data connection C2, and therefore the conference room being connected to all terminals in the existing multi-participant conversation 15 (D1, D2, D3).

Figure 3A:
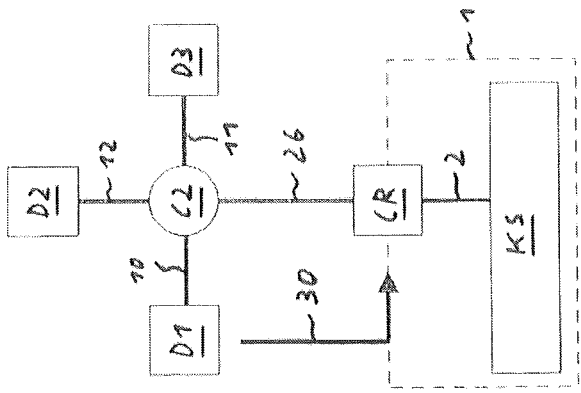
FIGS. 3a to 3c: each shows a schematic arrangement of logical units that are applied to execute the method for transferring control of an existing multi-participant conversation with three participants to a conference control application in a third embodiment, in which the master of the existing multi-participant conversation is called directly by the conference room.

In the third embodiment shown schematically in FIG. 3a, the master, represented by the communication terminal D1, is called directly by the conference room CR. Here an immediate call-waiting signal is guaranteed for the conference room on the communication terminal D1 as master of the existing multi-participant conversation in which the communication terminals D1, D2, and D3 are connected to each other via the existing data connection C2. The immediate call-waiting signal for the conference room CR on the communication terminal D1 takes place in under one second. The successful direct call from the conference room CR to the communication terminal D1 as master of the existing multi-participant conversation is shown in FIG. 3a via the data connection C4 with connection points 23, 24, through which the conference room is connected to the communication terminal D1. After this first step or first stage of a direct call from the conference room CR to the communication terminal D1, a second step or second stage involves switching the conference room CR into the existing data connection C2, as shown schematically by arrow 29 in FIG. 3a. The service operation CSTA Service Conference Call can be used to switch the conference room CR into the existing data connection C2.

Figure 3B:
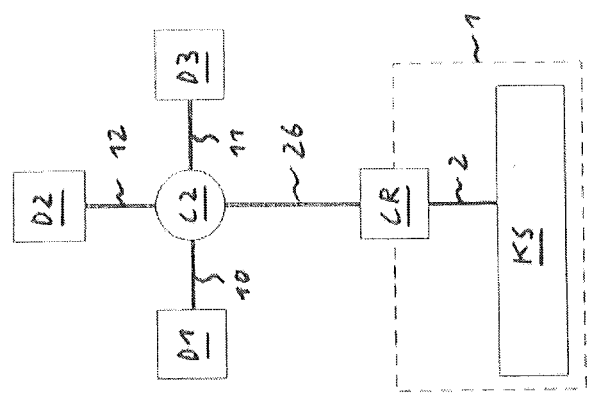

After the conference room CR is switched into the existing data connection C2, the conference room CR is connected via the connection point 26 to the communication terminals D1, D2, and D3 through the existing data connection C2 with connection points 10, 11, and 12, as shown in FIG. 3b. Despite the sequencing of multiple services within the system, as part of the third embodiment of the invention shown in FIGS. 3a to 3c, the first service or first service operation for the direct call from the conference room CR to the communication terminal D1, and for switching the conference room CR into the existing data connection C2 as the second service or second service operation, is transferring control of the existing multi-participant conversation with communication terminals D1, D2, and D3 to the application KS, with barely any or no interruption for the participants in the existing multi-participant conversation. As already stated, the conference room CR can be switched into the existing data connection C2 by means of an expanded application of the service operation CSTA Service Conference Call according to ECMA Guidelines 269, 8th edition, June 2009.

Figure 3C:
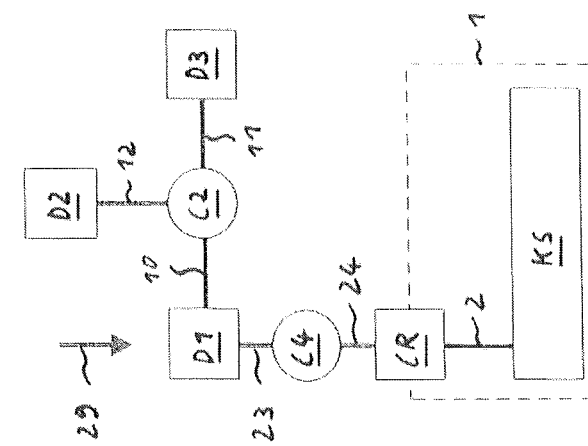

After the conference room CR is switched into the existing data connection C2 using connection point 26, the master role that was assumed by the participant on communication terminal D1 is transferred to the conference room, as shown schematically with an arrow 30 in FIG. 3c. The result is an application-controlled conference with a virtual participant in the form of the conference room CR and the three participants on the communication terminals D1, D2, and D3. If the multi-participant conversation in which the terminals D1, D2, and D3 are connected to each other is a system conference, transferring the master role from the communication terminal D1 to the conference room CR converts the system conference into an application-controlled conference. This makes it possible for the master of the application-controlled conference to add additional participants into the conference without manual expansion, so that the participants already in the conference can remain in the existing voice connection C2.

Because manual expansion of the conference to add another participant, as is done in a system conference, is not necessary in an application-controlled conference, expanding the conference to add another participant does not involve the conference interruption caused by the required call back to the participant being added. Instead, all participants, consisting of the conference room CR and the communication terminals D1, D2, and D3, as well as any other participants to be added, are switched to the conference room, and the conference room takes over or "inherits" the conference master status from the communication terminal D1. Transferring the master role from the communication terminal D1 to the conference room CR is dependent upon the implementation in the platform or dependent upon the capabilities of the application KS and of the conference server. For example, the conference leader up to that point can then operate the application-controlled conference only through the application KS and no longer through is communication terminal D1, with operating understood to mean expanding or closing, i.e., terminating, the conference. Because it is no longer possible to operate the conference through the communication terminal D1, concurrent access to the conference, or, more precisely, to control of the conference, is prevented, and the conference leader is then able to access even conference participants on other nodes, or, more precisely, conference participants' communication terminals that are assigned to nodes other than that of the communication terminals in the existing multi-participant conversation.

Figure 4C:
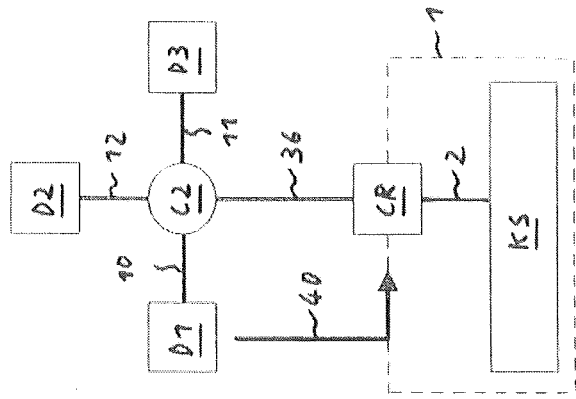
FIGS. 4a to 4c: each shows a schematic arrangement of logical units that are applied to execute the invented method for transferring control of an existing multi-participant conversation to a conference control application in a fourth embodiment, in which the conference room is called directly by the master of the existing multi-participant conversation with three participants.
Figure 4B:
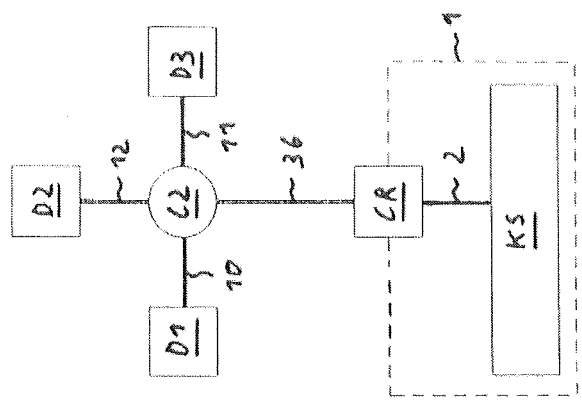
Figure 4A:
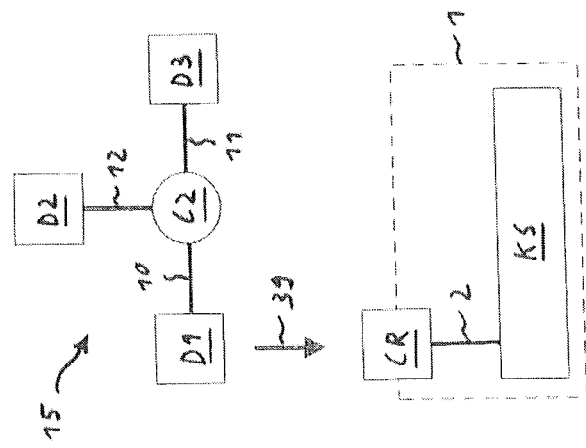

In the fourth embodiment of the invention, shown schematically in FIGS. 4a to 4c, the conference room CR is switched directly into the existing connection C2 by the master of the existing multi-participant conversation 15 using his communication terminal D1. The service operation CSTA Service Single Step Conference Call can be used to switch the conference room CR directly into the existing data connection C2, as shown schematically in FIG. 4a by the arrow 39. After the conference room is switched directly into the existing data connection C2, the conference room CR is connected via the connection point 36 to the existing data connection C2, which includes the additional connection points 10, 11, and 12 and involves communication terminals D1, D2, and D3 (FIG. 4b).

FIG. 4c shows the master role, which was assumed by the communication terminal D1 in the existing multi-participant conversation 15, transferred to the conference room CR as shown schematically in case 40. An expanded application of CSTA Service Single Step Conference Call according to ECMA Guidelines 269, 8th edition, June 2009 can be used for the procedural step of switching the conference room CR into the existing data connection C2 and transferring the master role from the communication terminal D1 to the conference room CR, in one step or one stage. This one-step or one-stage incorporation of the conference room CR into the existing multi-participant conversation 15 or the existing data connection C2 of the multi-participant conversation 15 involves an interruption that is so short that it is not noticeable to the participants in the existing multi-participant conversation 15.

Figure 5C:
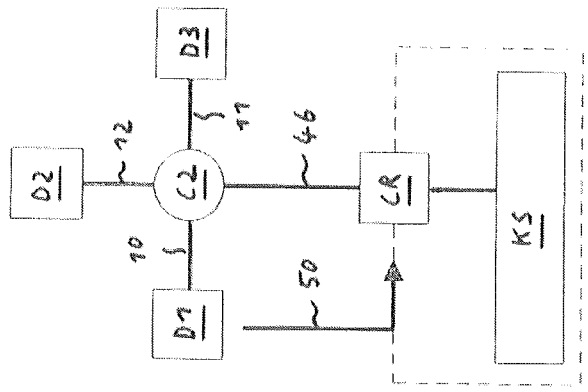
FIGS. 5a to 5c: each shows a schematic arrangement of logical units that are applied to execute the method for transferring control of an existing multi-participant conversation with three participants to a conference control application in a fifth embodiment, in which the conference room is switched directly into the existing data connection.
Figure 5B:
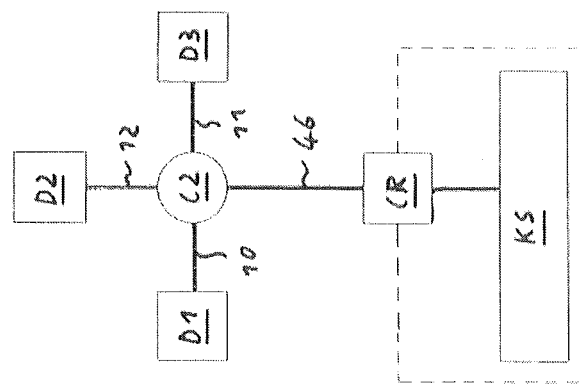
Figure 5A:
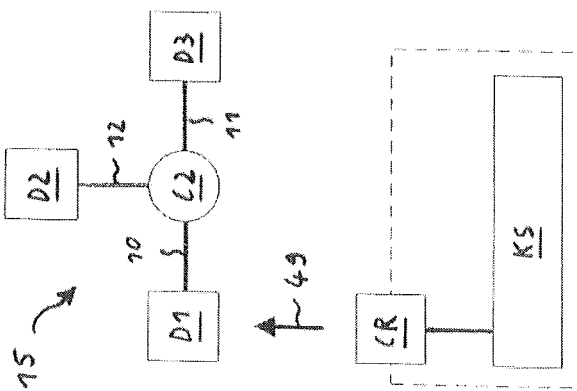

FIGS. 5a, 5b, and 5c schematically show a fifth embodiment of the invention, in which the conference room CR is switched directly into the existing data connection C2 of the existing multi-participant conversation 15 involving communication terminals D1, D2, and D3. Unlike the embodiment shown in FIGS. 4a to 4c, in this fifth embodiment the conference room is not switched directly into the existing data connection C2 by the master of the existing multi-participant conversation 15, but rather the conference room CR switches itself into the existing data connection C2 upon the corresponding instruction from the application KS. This is shown in FIG. 5a, which schematically shows the direct switching of the conference room into the existing data connection C2, by the arrow 49 pointing from the conference room CR to the communication terminal D1. Instead, FIG. 4a shows the direct switching of the conference room CR into the existing data connection C2 initiated through the communication terminal D1 of the master of the existing multi-participant conversation 15, indicated by the arrow 39 pointing from the communication terminal D1 toward the communication room CR.

Whereas in the embodiment shown in FIGS. 4a to 4c the master of the existing multi-participant conversation 15 initiates the direct switching of the conference room into the existing data connection C2, in the fifth embodiment shown in FIGS. 5a to 5c, the user of the application KS initiates the direct switching of the conference room CR into the existing data connection C2. After the conference room CR is switched into the existing data connection C2, the conference room CR, as shown in FIG. 5b, is switched through the connection point 46 into the existing data connection C2 such that the existing multi-participant conversation can be controlled through the application KS and the conference room CR if the master role is transferred from the communication terminal D1 of the master of the current multi-participant conversation 15 to the conference room CR, as shown schematically in FIG. 5c by the arrow 50.

In a sixth embodiment shown in FIGS. 6a to 6c, compared to the fifth embodiment shown in FIGS. 5a to 5c, the conference room is switched into the existing data connection C2 as the result of an action of the user of the application KS initiated via the connection point 56 (FIG. 6b), after the conference room CR is switched into the existing data connection C2, for example by service operation CSTA Service Join Call, as shown schematically by the arrow 59 in FIG. 6a. Corresponding to the transfer of the master role from the existing multi-participant conversation 15 through the communication terminal D1 to the conference room CR as in case 50 in FIG. 5c, this master role is transferred to the conference room CR in FIG. 6c and assigned to the conference room CR as indicated schematically by the arrow 60. Unlike the fifth embodiment shown in FIGS. 5a to 5c, in the sixth embodiment according to FIGS. 6a to 6c the existing multi-participant conversation 15, involving communication terminals D1, D2, and D3 that are connected to each other through connection points 10, 11, and 12 on the existing data connection C2, is assigned to a node KA In addition, the application KS, which is connected to the conference room CR through the connection 2, and the application server 1 on which the application KS is installed are assigned to another node KB. By directly switching the conference room CR to the existing data connection C2, as shown schematically by the arrow 59 in FIG. 6a, and transferring the master role from the communication terminal D1 to the conference room, as shown schematically by the arrow 60 in FIG. 6c, the conference room is incorporated from a network consisting of nodes KA and KB into the existing multi-participant conversation 15. This one-step or one-stage incorporation of the conference room CR into the existing multi-participant conversation 15 by switching the conference room CR into the existing data connection C2 and transferring the master role from the communication terminal D1 to the conference room CR can be accomplished using the service operation CSTA Service Join Call. This application of the service operation CSTA Service Join Call for one-step or one-stage incorporation of the conference room CR into an existing multi-participant conversation 15 with transfer of control of the existing multi-participant conversation to the application KS is an application of the CSTA Service Join Call that to date has not yet been documented according to Guidelines ECMA 269 for service operations according to CSTA.

Figure 7A:
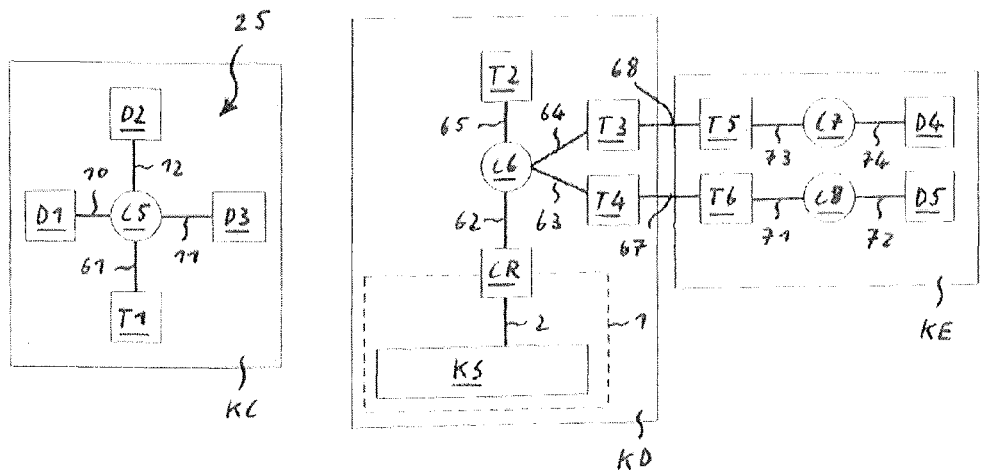
FIGS. 7a and 7b: each shows a schematic arrangement of logical units that are applied to execute the invented method in a seventh embodiment, in which the conference room is switched directly into the existing data connection as in the sixth embodiment shown in FIGS. 6a to 6c, wherein a multi-node conference is set up after the conference room is incorporated into the existing multi-participant conversation.
Figure 7B:
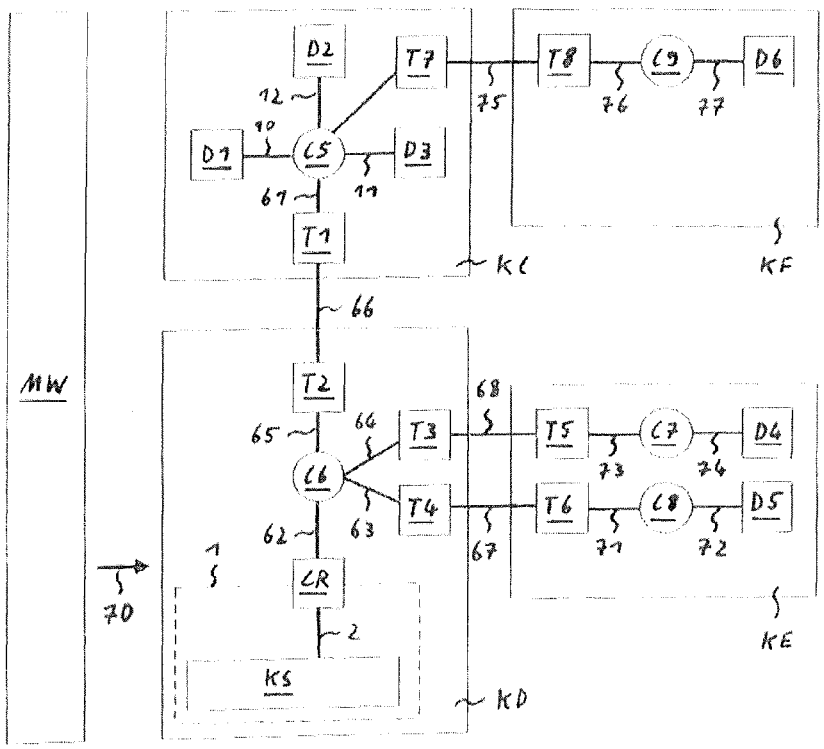

In another networked embodiment of the invented method for transferring control of an existing multi-participant conversation to the application KS, FIGS. 7a and 7b show the incorporation of the conference room CR into the existing multi-participant conversation 25 to create a multi-node conference. A multi-node conference is understood to be a conference in which multiple nodes are incorporated as network nodes on the network into the conference that is being set up. FIG. 7a shows a node KC in which communication terminals D1, D2, and D3 are connected to each other through connection points 10, 12, and 11 of the existing data connection C5 as part of an existing multi-participant conversation 25.

In addition, a network trunk T1 is incorporated into the existing data connection C5 through the connection point 61. The network trunk T1 permits the collection of multiple transfer channels, in the form of physical wires or multiple frequency bands, to form a single logical connection that is individually visible to the operator of the network trunk. Unlike the preceding embodiments of the invention in FIGS. 1 to 6, in FIG. 7a the conference room CR, before it is incorporated into the existing multi-participant conversation 25, is already a virtual participant in an application-controlled conference that includes the participants using communication terminals D4 and D5 as well as any virtual participants in the conference CR. Here the communication terminals D4 and D5 are connected to the conference room CR through an existing data connection C6 via the connection point 62. The existing data connection C6 includes the additional connection points 63 and 64, wherein the connection point 63 connects a network trunk T4 to the conference room CR and the network trunk T4 is connected through the connection point 67 to another network trunk T6, which in turn is connected through connection points 71 and 72 in the existing data connection C8 to the communication terminal D5.

The network trunk T3 is connected through the connection point 64 and the connection point 62 to the conference room CR, wherein the network trunk T3 is connected through another connection point 68 to a network trunk T5, which in turn is connected to the communication terminal D4 through connection points 73 and 74 of the existing data connection C7. The connection points 67 and 68 create data connections between the node KE and the communication terminals D4 and D5 and from the network trunks T5 and T6 to the communication node KD, which includes the network trunks T3 and T4 in addition to the application KS and the conference room CR. In addition to the network trunks T3 and T4 of the node KD, this node includes another network trunk T2 that is connected to the conference room CR through the connection point 65 and the connection point 62.

After the conference room CR is switched directly into the existing data connection C5, the conference room CR is switched through the network trunks T1 and T2 into the existing multi-participant conversation 25 that involves terminals D1, D2, and D3 and is connected to those terminals, as shown in FIG. 7b. After the master role is assigned to the conference room CR, control instructions can be forwarded from the application KS by means of the master CR to the participants in the resulting application-controlled conference involving the communication terminals D1, D2, D3, D4, and D5, via the connection point 66 through which the network trunk T1 on the node KC is connected to the network trunk T2 on the other node KD. In addition, after the conference room CR is incorporated into the existing multi-participant conversation 25 by switching the conference room CR into the existing data connection C5 and assigning the master role to the conference room CR, it is possible to incorporate potential additional participants into the existing multi-node conference involving nodes KC, KD, and KE.

In this regard, FIG. 7b shows another node KF on which a communication terminal D6 and a network trunk T8 are connected to each other through connection points 76 and 77 on the existing data connection C9. The network trunk T8 is connected to the conference room CR on the node KD through another network trunk T7 on the network node KC via the connection point 75, whereby the additional communication terminal D6 is incorporated into the existing application-controlled conference involving the communication terminals D1, D2, D3, D4, and D5 through the existing data connection C9. The resulting application-controlled conference thus includes six communication terminals D1-D6 operated by the various participants in the conference, and control of this application-controlled conference is assumed by the application KS for controlling this conference through the conference room to which the master role has been assigned.

In the seventh embodiment shown in FIG. 7b, the node KD, with the application KS, which can be in the form of software on a conference server such as OpenScape Office from Siemens Enterprise Communications GmbH & Co. KG, can be designated as a source node. Unlike the source node KD with the application KS and the conference room CR, the nodes KC, KE, and KF, which include the communication terminals D1, D2, D3 (node KC), D4, D5 (node KE), and D6 (node KF), can be designated as target nodes. The service operation CSTA Service Join Call for switching the conference room CR directly into the existing data connection C5 can be applied to the source node KD via a so-called single system image, through which multiple nodes, each constituting a separate system, appear outwardly as a single system, such that the application KS doesn't need to know in which of the nodes KC, KD, KE, and KF a service operation, also called a service, has to be implemented (this knowledge is contained in so-called middleware MW), using middleware MW appropriate for the single system image (see arrow 70 in FIG. 7b). This control information can be forwarded, for example, by a suitable CorNet-NQ Facility Service Operation to the target nodes KC, KE, and KF, allowing multi-node control of the application-controlled conference. In the target nodes KC, KE, and KF, each of the respective network trunks T1 (node KC), T5, T6 (node KE), and T8 (node KF) can assume the master role as a proxy in the local multi-participant conversation. This allows the network trunk T1 to assume the master role as a proxy for the existing multi-participant conversation D1, D2, D3 in the network node KC. If the multi-participant conversation 25 is a system conference, the network trunk T1 assumes the master role as a proxy in the local system conference occurring in the network node KC, wherein, by incorporating the conference room CR into this system conference, the network trunk T1 runs this former system conference as an application-controlled conference with the conference room CR as master. Although the master roll has to be processed again by transferring it from the existing multi-participant conversation 25 to the conference room CR in order to assign the master role to the conference room CR, it is not necessary to assign the master role to the conference room CR for a multi-participant conversation with only two participants, as shown in FIG. 1c for the multi-participant conversation 5. The network trunk T1 assumes the master role in the (former) system conference, in which format the multi-participant conversation 25 is conducted, only as a proxy, while the master role remains assigned to the conference room CR.

The features of the invention described in relation to the embodiments presented, such as the middleware MW in FIG. 7b, multiple existing data connections C5, C6, C7, C8, and C9 of an application-controlled conference after transferring the master role to the conference room CR, or the availability of an application-controlled conference CR through the application KS before control of an existing multi-participant conversation 25 is transferred to the application KS, can also be applied to other embodiments of the invention, unless stated otherwise or prevented for technical reasons.

The incorporation of a conference room into an existing multi-participant conversation, with little or no interruption for the participants of the existing multi-participant conversation according to the invention, by means of which control of the existing multi-participant conversation is transferred to a conference control application with a shorter interruption than the prior state of the art, makes it possible for the leader of the conference to transfer manual control of a multi-participant conversation in the form of a system conference to an application that creates an application-controlled conference, without any loss of time.

By giving control of the multi-participant conversation to the application, the conference leader can take advantage of the application's advantages, such as the ability to expand the existing multi-participant conversation at the same time using the application. In addition, the invented method makes it possible to increase the maximum number of participants in a multi-participant conversation, as part of the application-controlled conference resulting from transferring control of the multi-participant conversation to the application. This gives the following new features to conference control applications, which are used to execute the invented method:
  improved user control,
  optimized initiation of the conference,
  faster establishment of the conversation, with little or no interruption for the conference participants,
  easier conversation management, and
  easier increasing of the number of conference participants.

The invention claimed is:

1. A method for transferring control of an existing multi-participant conversation, in which at least two communication terminals are connected to each other through a data connection, to a conference control application, comprising the following steps:
  creating of a virtual conference room that serves as an anchor point for the application and can be a virtual participant in the conversation,
  switching the conference room into the data connection, and
  assigning a master role to the conference room, wherein a signal generated by the application causes the switching of the conference room into the data connection and the assignment of the master role to the conference room;
  wherein the master role is assigned to the conference room by transferring the master role of the multi-participant conversation from one of the communication terminals to the virtual conference room via the signal generated by the application simultaneously with the switching of the conference room into the data connection; and
  wherein at least three communication terminals are connected to each other in the conversation.

2. The method of claim 1, wherein the multi-participant conversation is conducted in the form of a system conference.

3. The method of claim 2, comprising, incorporating, or converting the system conference into an application-controlled conference.

4. The method of claim 3, comprising changing system-controlled conference channels for the system conference to application-controlled channels for the conference control application.

5. The method of claim 1, comprising, before switching the conference room into the existing data connection, handing over the conference room to the communication terminal assigned the role of master of the multi-participant conversation using a service operation selected from the group consisting of CorNet-NQ and QSIG Single Step Call Transfer.

6. The method of claim 1, comprising before the conference room is switched into the existing data connection, sending a call-waiting signal for the conference room to the communication terminal of the multi-participant conversation that was assigned a master role for the multi-participant conversation in under one second.

7. The method of claim 1, wherein the conference room is switched into the existing data connection using a service operation selected from the group consisting of CSTA Service Conference Call and CSTA Service Join Call.

8. The method of claim 1, comprising after assigning the master role to the conference room, adding additional communication terminals into the multi-participant conversation with node overlapping.

9. The method of claim 1, wherein the switching of the conference room into the data connection comprises:
  transferring or handing over the conference room to the communication terminal of the existing multi-participant conversation initially assigned the master role;
  generating a call-waiting signal for the conference room in the communication terminal of the existing multi-participant conversation initially assigned the master role, the call-waiting signal occurring in less than one second after the transferring or handing over of the conference room; and
  switching the conference room into the data connection after the transferring or handling over of the conference room to connect the conference room to all the communication terminals of the multi-participant conversation.

10. The method of claim 1, comprising:
  after the master role is assigned to the conference room and after the conference room is switched into the data connection, incorporating, by the conference room, additional participants into the existing multi-participant conference; and
  wherein a trunk is assigned as a proxy to the conference room so that an address of the conference room remains hidden from the communication terminals of the multi-participant conference.

11. The method of claim 1, wherein the multi-participant conversation is a conference call or a video conference call.

12. A method for transferring control of an existing multi-participant conversation, in which at least two communication terminals are connected to each other through a data connection, to a conference control application, comprising the following steps:
  creating of a virtual conference room that serves as an anchor point for the application and can be a virtual participant in the conversation,
  switching the conference room into the data connection, and
  assigning a master role to the conference room, wherein a signal generated by the application causes the switching of the conference room into the data connection and the assignment of the master role to the conference room; and wherein the switching of the conference room into the data connection comprises:

switching the conference room directly into the data connection by the communication terminal of the existing multi-participant conversation initially assigned the master role such that the assigning of the master role from the communication terminal of the existing multi-participant conversation initially assigned the master role to the conference room occurs in a single step at a same time as the switching of the conference room into the data connection.

13. The method of claim 12, wherein at least three communication terminals are connected to each other in the conversation.

14. The method of claim 12, comprising switching the conference room in a source node of a network in the existing data connection into a target node of the network, and causing a network trunk in the target node to be a proxy for the application.

15. The method of claim 12, comprising switching the conference room in a source node in the existing data connection to a target node via a single system image in the source node using a service operation.

16. The method of claim 12, wherein the application is run on a conference server device.

17. The method of claim 12, wherein the application is run on a conference server computer device.

18. Computer-readable non-transitory storage media having executable code stored thereon that defines a method that is performed when the code is executed by a conference system device, the method comprising:

creating of a virtual conference room that serves as an anchor point for an application and can be a virtual participant in an existing multi-participant conversation in which at least two communication terminals are connected to each other through a data connection;

switching the conference room into the data connection; and assigning a master role to the conference room, wherein a signal generated by the application causes the switching of the conference room into the data connection and the assignment of the master role to the conference room; and wherein the master role is assigned to the conference room by transferring the master role of the multi-participant conversation from one of the communication terminals to the virtual conference room via the signal generated by the application simultaneously with the switching of the conference room into the data connection.

19. A server having the computer-readable non-transitory storage media of claim 18 that is configured to execute the executable code.

\* \* \* \* \*